(12) United States Patent
Nakata

(10) Patent No.: US 9,766,839 B2
(45) Date of Patent: Sep. 19, 2017

(54) INFORMATION PROCESSING APPARATUS, CONTROL METHOD, AND RECORDING MEDIUM

(71) Applicant: CANON KABUSHIKI KAISHA, Tokyo (JP)

(72) Inventor: Hiroaki Nakata, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/802,855

(22) Filed: Jul. 17, 2015

(65) Prior Publication Data
US 2016/0026903 A1    Jan. 28, 2016

(30) Foreign Application Priority Data
Jul. 24, 2014    (JP) .................. 2014-151195

(51) Int. Cl.
*G06K 15/00*    (2006.01)
*G06F 3/12*    (2006.01)
*G06K 9/36*    (2006.01)

(52) U.S. Cl.
CPC .......... *G06F 3/1206* (2013.01); *G06F 3/1247* (2013.01); *G06F 3/1286* (2013.01)

(58) Field of Classification Search
CPC .... G06F 3/1208; G06F 3/1204; G06F 3/1205; G06F 3/1276; G06F 3/1246; G06F 3/1256; G06F 3/1277; G06F 3/1284; G06F 17/212; G06F 17/218; G06F 17/2247
USPC ........ 358/1.11–1.18, 1.6, 1.9, 2.1, 462, 537; 715/273–277; 703/27; 710/14, 15, 31, 710/33
See application file for complete search history.

(56) References Cited

U.S. PATENT DOCUMENTS

| 5,999,710 | A | * | 12/1999 | Smith | G06K 15/12 358/1.13 |
| 6,661,526 | B1 | * | 12/2003 | Daly | G06F 3/1204 358/1.13 |
| 2008/0117453 | A1 | * | 5/2008 | Toda | H04N 1/00204 358/1.15 |

(Continued)

FOREIGN PATENT DOCUMENTS

JP    2006-215879 A    8/2006

OTHER PUBLICATIONS

Filter Pipeline configuration files. Microsoft. Link: https://docs.microsoft.com/en-us/windows-hardware/drivers/print/filter-pipeline-configuration-file.*

(Continued)

*Primary Examiner* — Chad Dickerson
(74) *Attorney, Agent, or Firm* — Canon USA, Inc. IP Division

(57) ABSTRACT

In an information processing apparatus according to the present invention, if setting of performing imaging processing of converting a page of print data into a raster image is accepted, a first filter converts a page of first print data into a raster image and stores the raster image as second print data in a storage area, and a third filter acquires the second print data from the storage area, and if setting of not performing the imaging processing is accepted, the first filter transmits the first print data to a second filter that converts print data received from the first filter, and the third filter acquires, from the second filter, the first print data converted by the second filter.

14 Claims, 11 Drawing Sheets

(56) References Cited

U.S. PATENT DOCUMENTS

| | | | | |
|---|---|---|---|---|
| 2008/0151294 | A1* | 6/2008 | Natori | G06F 17/211 |
| | | | | 358/1.15 |
| 2008/0316514 | A1* | 12/2008 | Arakawa | G06F 3/1207 |
| | | | | 358/1.9 |
| 2009/0109483 | A1* | 4/2009 | Shimmoto | H04N 1/00954 |
| | | | | 358/1.15 |
| 2009/0147308 | A1* | 6/2009 | Hasegawa | G06F 17/2247 |
| | | | | 358/1.15 |
| 2009/0237721 | A1* | 9/2009 | Jeong | G06F 3/1208 |
| | | | | 358/1.15 |
| 2009/0284786 | A1* | 11/2009 | Natori | G06F 17/212 |
| | | | | 358/1.15 |
| 2010/0214599 | A1* | 8/2010 | Zhan | G06F 3/1205 |
| | | | | 358/1.15 |
| 2012/0297299 | A1* | 11/2012 | Shiohara | H04N 1/00405 |
| | | | | 715/274 |

OTHER PUBLICATIONS

XPS filters. Microsoft. Link: https://msdn.microsoft.com/en-us/windows/hardware/drivers/print/xps-filters.*
XPSDrv Render Module. Microsoft. Link: https://msdn.microsoft.com/windows/hardware/drivers/print/xpsdrv-render-module.*
Using the XPS Rasterization Service. Microsoft. Link: https://docs.microsoft.com/en-us/windows-hardware/drivers/print/using-the-xps-rasterization-service.*

* cited by examiner

FIG. 3
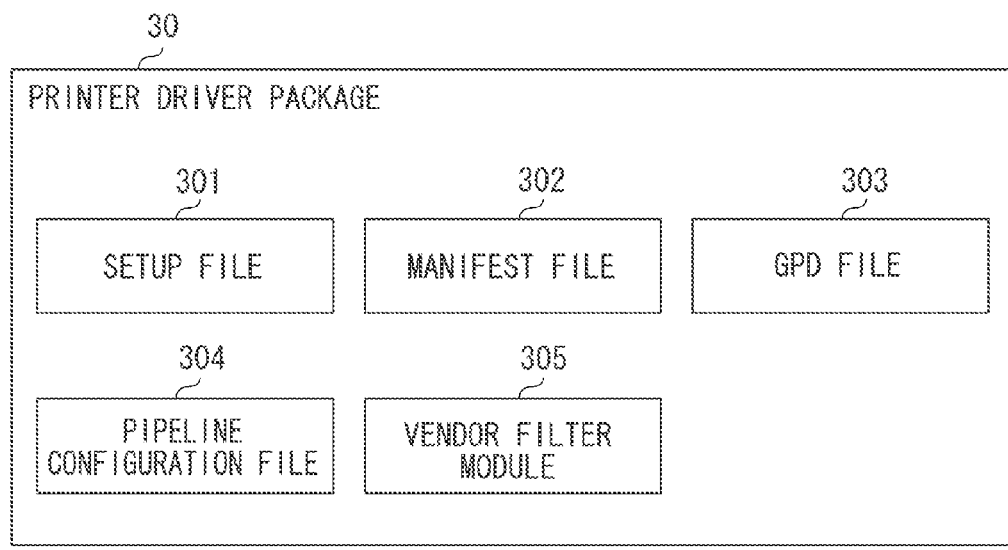
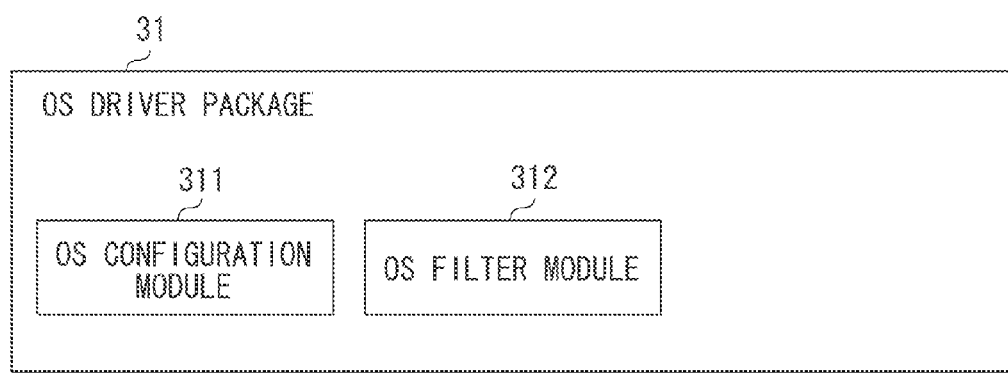

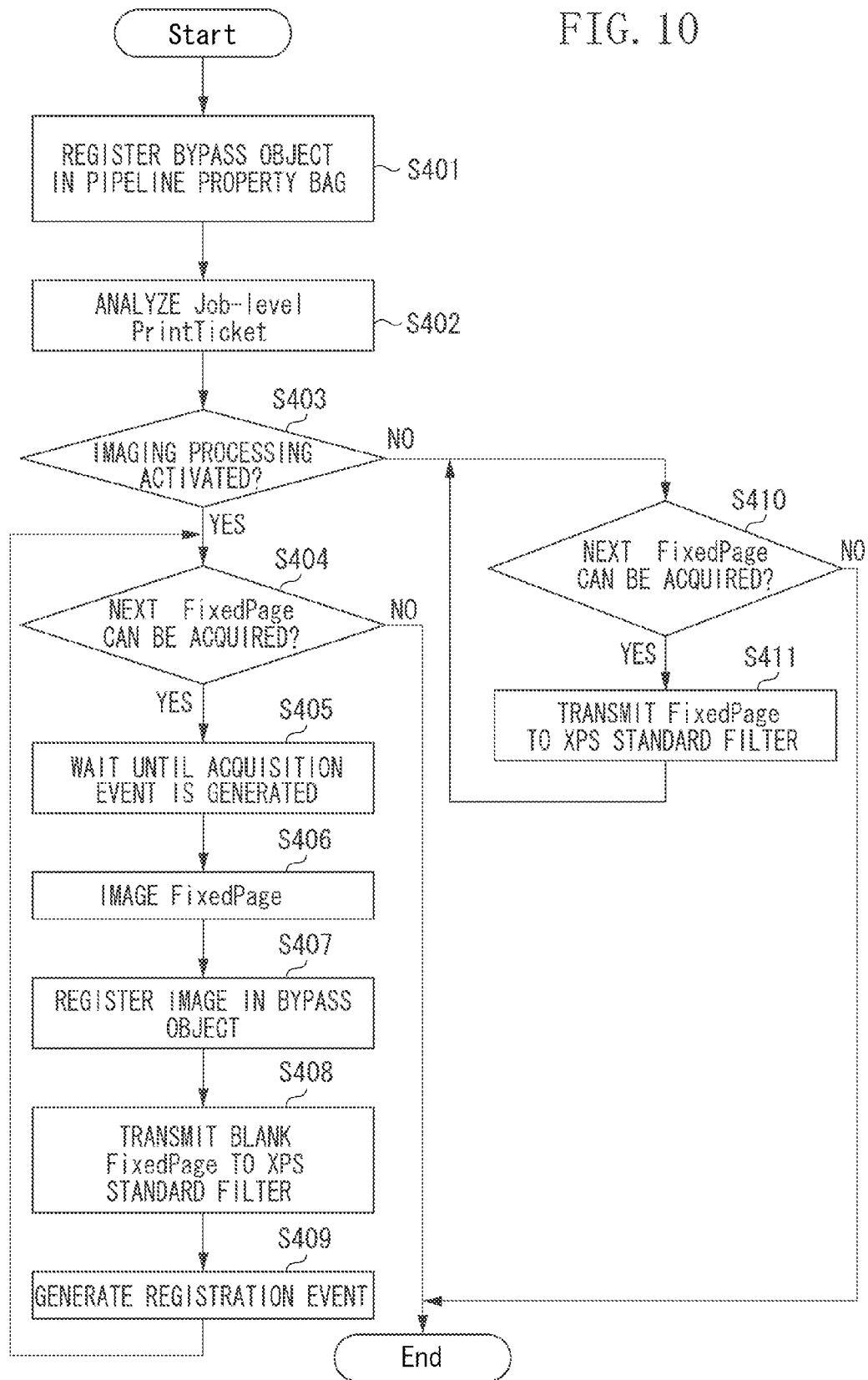

INFORMATION PROCESSING APPARATUS, CONTROL METHOD, AND RECORDING MEDIUM

BACKGROUND OF THE INVENTION

Field of the Invention

The present invention relates to a technique for processing print data by using a filter.

Description of the Related Art

Conventionally, there are techniques of implementing a plurality of functions for processing data by dividing these functions into modules.

Japanese Patent Application Laid-Open No. 2006-215879 discusses a technique for performing processing by using each filter provided as a module.

SUMMARY OF THE INVENTION

In the present specification, a method for processing print data by using a filter provided as in Japanese Patent Application Laid-Open No. 2006-215879, will be discussed. In a configuration where sequential processing is performed on print data by using a plurality of filters, an achievable function may be determined depending on adopted filters, which may prevent a dynamic change between adoption and non-adoption of a filter according to a request. In such a case, it is difficult to change a process content of a filter according to a request.

It may be desirable to change a process content, for example, in a case where print data is processed using a specific filter, and a drawing failure occurs in a printer output because the processed print data includes a printer-dependent drawing command.

Specific examples of the case where the drawing failure occurs include a case where an external character or vertical writing font not supported by a printer is designated as an attribute of a text command. The specific examples also include a case where drawing of a polygon is designated, which has apexes whose number exceeds a maximum processible by a printer.

Therefore, as a way of avoiding such a drawing failure, the present specification discusses a method of converting a page of print data of a text command, a graphics command, or the like, into an image in which there is no difference depending on a printer output.

However, even if this method is adopted, the following inconvenience occurs. In a case where the above-described converted image is to be processed via a specific filter incapable of changing a process content according to a request, as a result of the specific filter receiving the converted image, a data size of output print data increases more than necessary due to characteristics of the specific filter. As a result, a delay in the processing occurs. Such an issue and any solution thereto are not discussed in Japanese Patent Application Laid-Open No. 2006-215879.

According to an aspect of the present invention, an information processing apparatus includes an accepting unit configured to accept setting of whether to perform imaging processing of converting a page of print data into a raster image, wherein, if the accepting unit accepts setting of performing the imaging processing, a first filter converts a page of first print data into a raster image and stores the raster image as second print data in a storage area, and a third filter acquires the second print data from the storage area, and wherein, if the accepting unit accepts setting of not performing the imaging processing, the first filter transmits the first print data to a second filter that converts print data received from the first filter, and the third filter acquires, from the second filter, the first print data converted by the second filter.

Further features of the present invention will become apparent from the following description of exemplary embodiments with reference to the attached drawings.

BRIEF DESCRIPTION OF THE DRAWINGS

FIG. 3 is a block diagram illustrating a configuration of software modules and data files relating to the print system.

FIG. 10 is a flowchart illustrating a flow of processing of an imaging filter according to a second exemplary embodiment.

DESCRIPTION OF THE EMBODIMENTS

Figure 1:
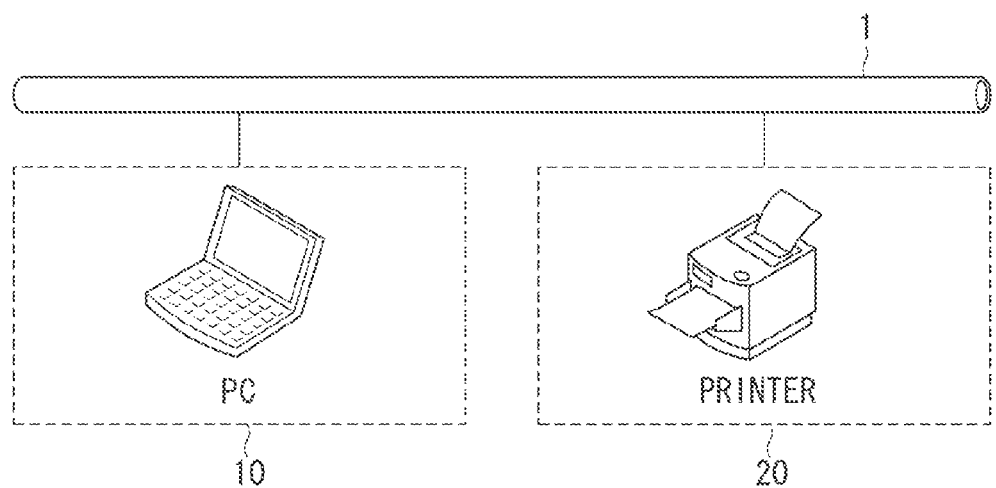
FIG. 1 is a diagram illustrating an apparatus configuration example to which a print system is applicable.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store information. Examples of the processor readable or machine accessible medium that may store include a storage medium, an electronic circuit, a semiconductor memory device, a read only memory (ROM), a flash memory, a Universal Serial Bus (USB) memory stick, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

A first exemplary embodiment of the present invention will be described below with reference to the drawings.

FIG. 1 is a diagram illustrating an apparatus configuration example to which a print system according to an exemplary embodiment is applicable. The print system includes a personal computer (PC) 10 (an information processing apparatus) and a printer 20.

The PC 10 and the printer 20 are connected via a local area network (LAN) 1. In the present exemplary embodiment, the LAN 1 supports a communication scheme of Ethernet. The LAN 1 may take a connection configuration such as a wired LAN, a wireless LAN, Bluetooth (registered trademark), or Universal Serial Bus (USB).

Figure 2:
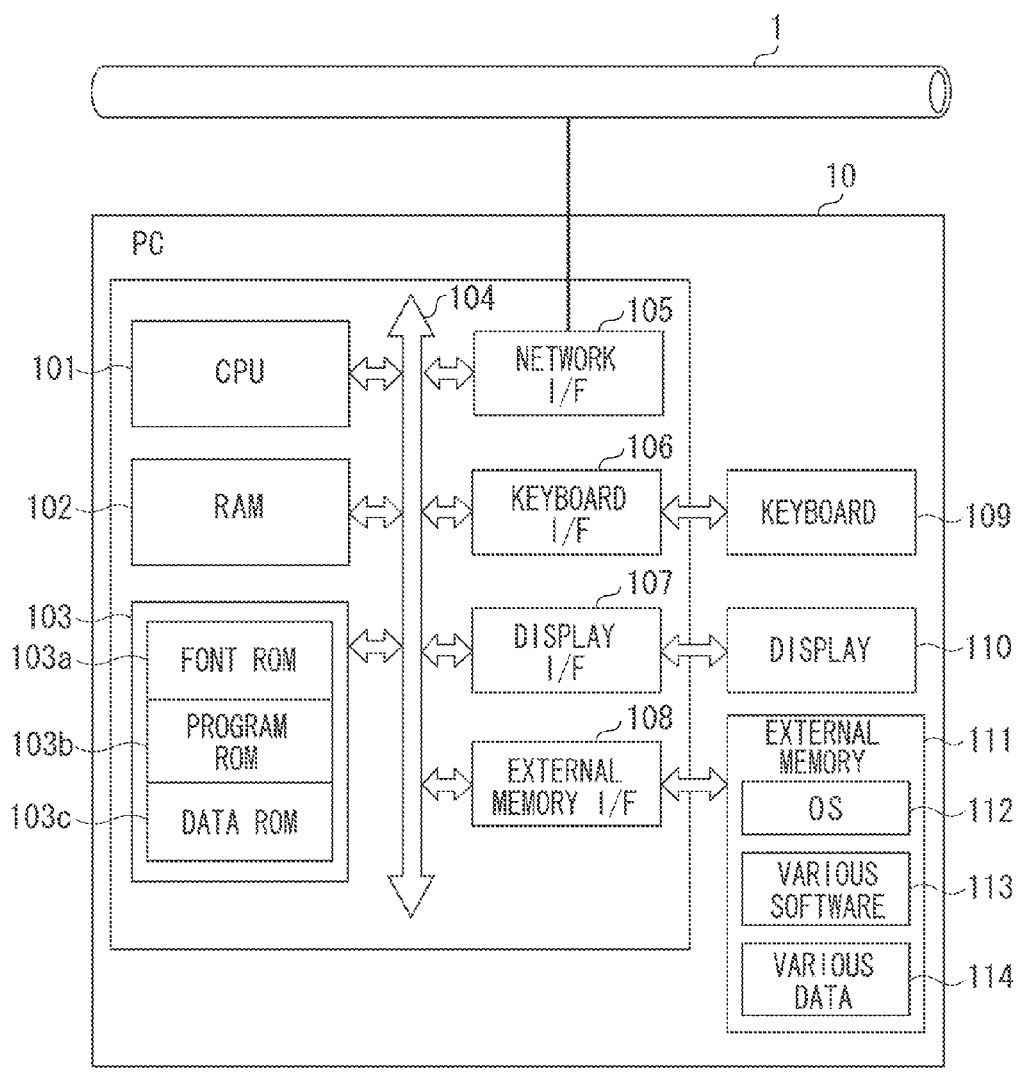
FIG. 2 is a block diagram illustrating a hardware configuration relating to the print system.

FIG. 2 is a block diagram illustrating a hardware configuration of the PC 10.

A central processing unit (CPU) 101 comprehensively controls devices connected to a system bus 104, according to a program stored in a random access memory (RAM) 102. The RAM 102 also functions as a main memory or a work area for the CPU 101.

In addition, the CPU 101 executes processing based on a program stored in an external memory 111, thereby implementing a software configuration of PC 10 as illustrated in FIG. 3, and the processing performed in each step of flowcharts to be described below.

A read only memory (ROM) 103 stores various programs and data. The ROM 103 includes a font ROM 103*a* storing various fonts, a program ROM 103*b* storing programs such as a boot program and a basic input output system (BIOS), and a data ROM 103*c* storing various data.

A network interface (I/F) 105 is connected to the LAN 1, and performs communication processing.

A keyboard I/F 106 controls key input from a keyboard 109 and a pointing device (a mouse) not illustrated.

A display I/F 107 controls display processing on a display 110.

An external memory I/F 108 controls, for example, access to the external memory 111 such as a hard disk (HD). The external memory 111 functions as a storage medium that stores an operating system (OS) 112, various kinds of software 113 supporting the print system according to the present exemplary embodiment, and various data 114 such as a user file and an edit file.

In the present exemplary embodiment, the OS 112 is assumed to be Microsoft Windows (registered trademark) 8.

FIG. 3 is a block diagram illustrating a static package configuration of software modules and data files relating to the print system according to the exemplary embodiment, in the PC 10.

All software modules and data illustrated in FIG. 3 are stored in the external memory 111, and loaded into the RAM 102 to be executed by the CPU 101, or read in.

A printer driver package 30 is a package including a software module and data files developed and provided by a printer vendor. Further, the printer driver package 30 can operate as a printer driver, by being set up in the OS 112 by a user.

A setup file 301 is a data file to be read by the OS 112 at the time of setup, and includes a configuration of the printer driver package 30 itself, and information about an OS driver package 31 on which the printer driver package 30 depends.

A manifest file 302 is a data file that describes initialization information of the printer driver.

A generic printer description (GPD) file 303 is a data file that defines function information of the printer driver. Specifically, the GPD file 303 describes information about functions of the printer driver such as usable paper sizes, duplex printing, and stapling. The GPD file 303 also describes function information about whether to activate a print method to which imaging processing to be described below is applied. The GPD file 303 is read in by the OS configuration module 311 included in the OS driver package 31.

A pipeline configuration file 304 is a data file that defines how a print processing order may be configured.

A vendor filter module 305 is developed by the printer vendor to implement print processing.

On the other hand, the OS driver package 31 is a software package used by the printer driver package 30. The OS driver package 31 is developed and provided by Microsoft Corporation.

An OS configuration module 311 displays a user interface of the printer driver based on the information defined in the GPD file 303, and generates a PrintTicket that is print setting data included in an XPS.

An OS filter module 312 incorporates print processing developed by Microsoft Corporation.

Figure 4:
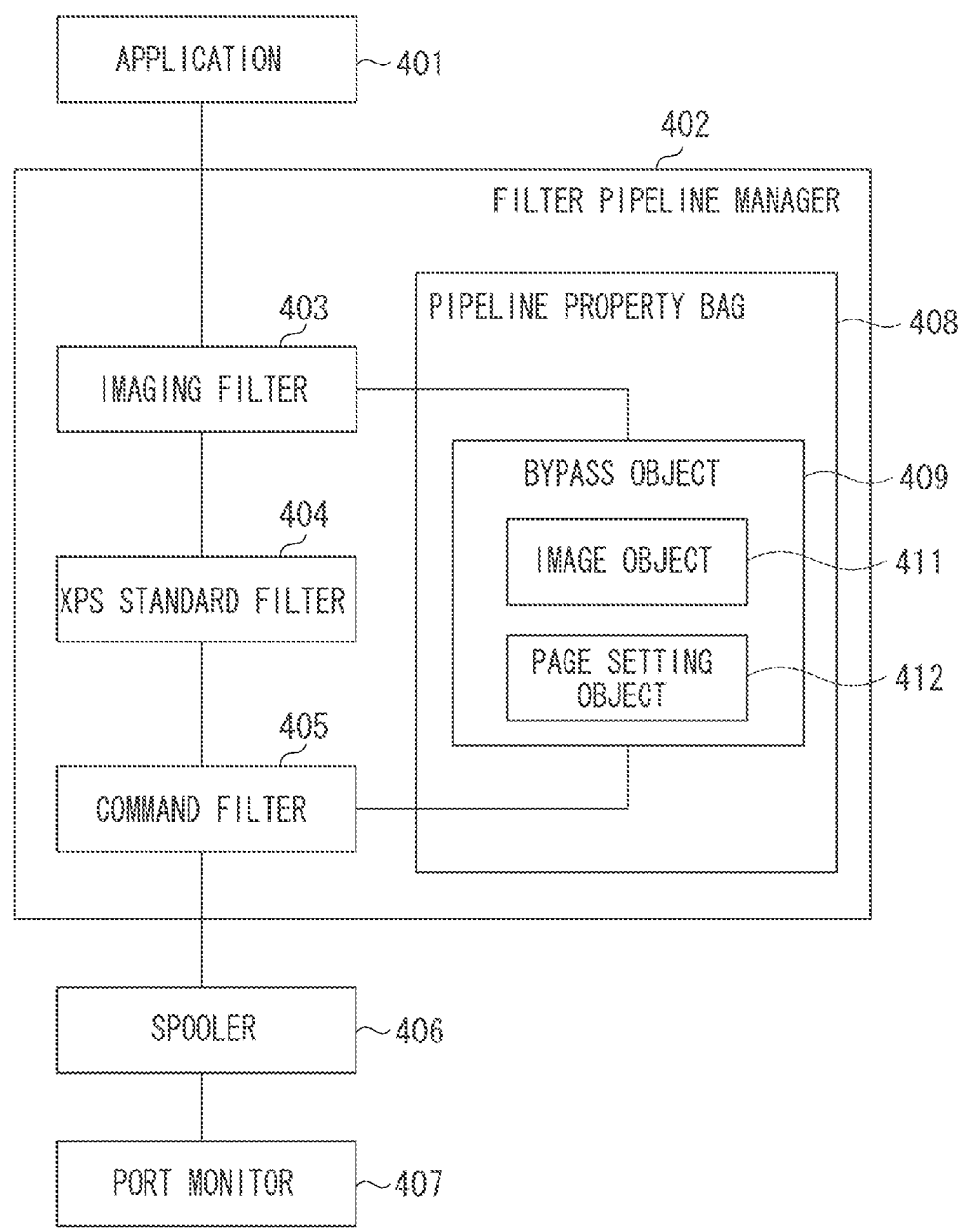
FIG. 4 is a block diagram illustrating a dynamic program object arrangement when print processing is executed.

FIG. 4 is a block diagram illustrating a dynamic program object arrangement, when a software module relating to print processing according to the present exemplary embodiment is loaded into the RAM 102 and executed by the CPU 101.

An application 401 is a piece of software for creating a document and causing the printer driver to perform print processing based on the created document. Upon receipt of a print instruction provided by a user, the application 401 converts a document into an XPS, and transmits the XPS to a filter pipeline manager 402 via a print application programming interface (API) provided by the OS 112.

In a version 4 (V4) printer driver, print processing is executed according to a programming model called an XPS print filter pipeline.

A module performing the print processing in the XPS print filter pipeline is called "filter". The filter pipeline manager 402 causes filters to process data sequentially. More specifically, there is provided a mechanism in which an output of a certain filter becomes an input of the next filter linked to this filter, and the filters sequentially process the inputs, to generate a printer description language (PDL) to be transmitted to the printer 20.

In the present specification, data (XPS and PCL) exchanged between the filters, and a bypass object stored in a property bag to be described below may also be referred to as "print data".

Upon receiving the XPS, the filter pipeline manager 402 reads in the pipeline configuration file 304, loads a filter according to the described filter configuration information, and links input/output interfaces between the filters.

In FIG. 4, each of an imaging filter 403, an XPS standard filter 404, and a command filter 405 is a filter loaded by the filter pipeline manager 402. Of these filters, the imaging filter 403 and the command filter 405 are incorporated into the vendor filter module 305. On the other hand, the XPS standard filter 404 is a filter (MSxpsPCL6.dll) made by Microsoft Corporation and incorporated into the OS filter module 312.

The XPS standard filter 404 outputs a PCL as an image command, by converting a lossy-compression image command into an image command to which Delta Row Compression that is a lossless-compression image format is applied. Therefore, there is such a feature that the data size of a PCL output by the XPS standard filter 404 becomes greater than the data size of a PCL configured of a lossy-compression image command.

In the present specification, the XPS standard filter 404 or the command filter 405 converts the received XPS into a PCL and outputs the PCL. A spooler 406 buffers the PCL output by the filter, and then a port monitor 407 transmits the PCL to the printer 20.

A pipeline property bag 408 is a storage area provided for data management, and accessible by all the filters. The filters can register data in or acquire data from the pipeline property bag 408, even if the respective input/output interfaces are not linked to each other. Therefore, the imaging filter 403 can transmit information to the command filter 405, not via the XPS standard filter provided therebetween.

A bypass object 409 is a data object transmitted/received via the pipeline property bag 408. The bypass object 409 stores an image object 411 and a page setting object 412 to be described below.

Figure 5:
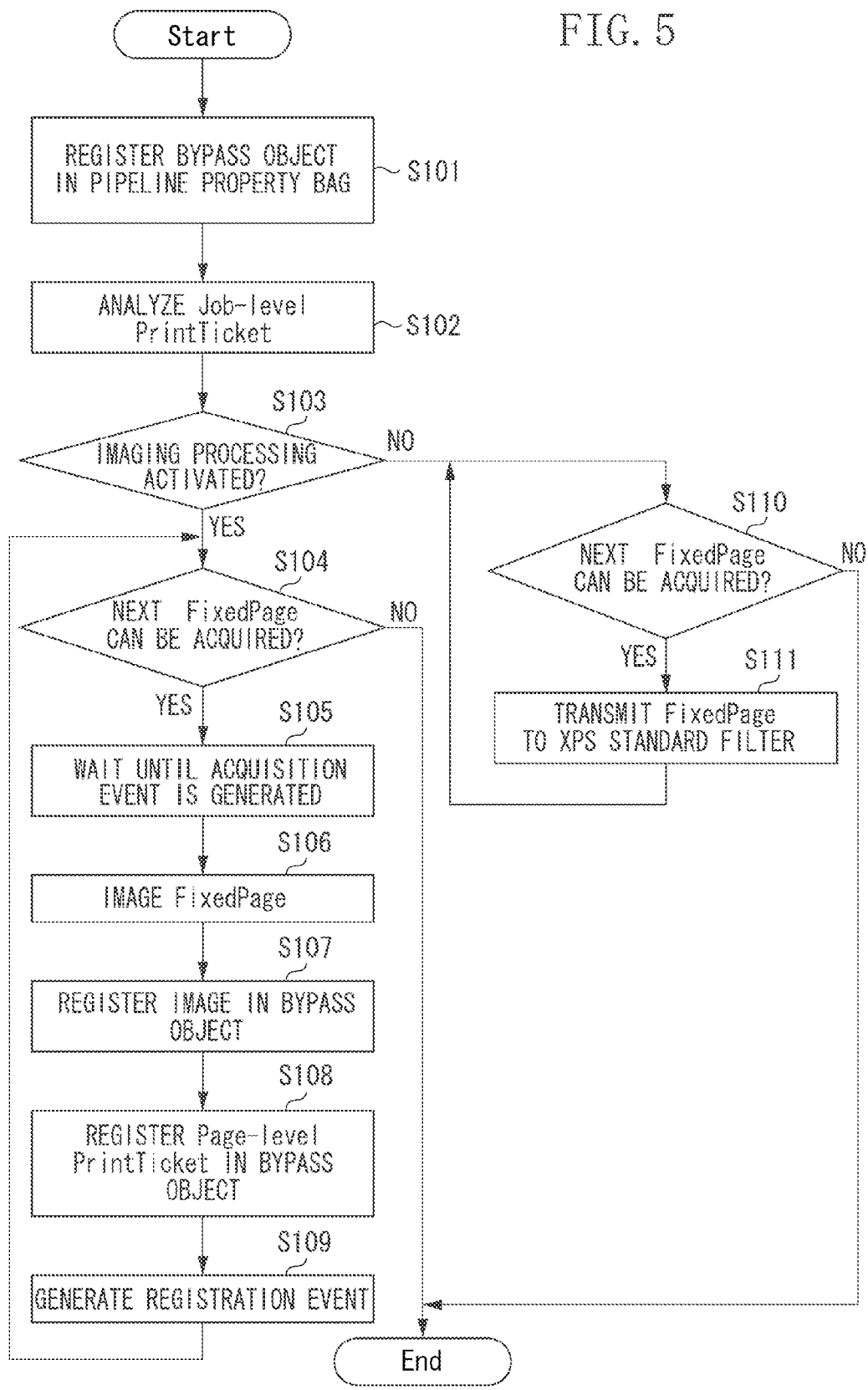
FIG. 5 is a flowchart illustrating a flow of processing of an imaging filter according to a first exemplary embodiment.

FIG. 5 is a flowchart illustrating print processing of the imaging filter 403 according to the first exemplary embodiment.

First, in step S101, upon being loaded by the filter pipeline manager 402, the imaging filter 403 generates the bypass object 409, and registers the generated bypass object 409 in the pipeline property bag 408. The bypass object 409 in this step is an empty object in which the image object 411 and the page setting object 412 are not present.

Next, in step S102, the imaging filter 403 acquires a Job-level PrintTicket by accessing parts forming an XPS input from the application 401 via the API provided by the filter pipeline manager 402, and analyzes the acquired Job-level PrintTicket.

Figure 8:
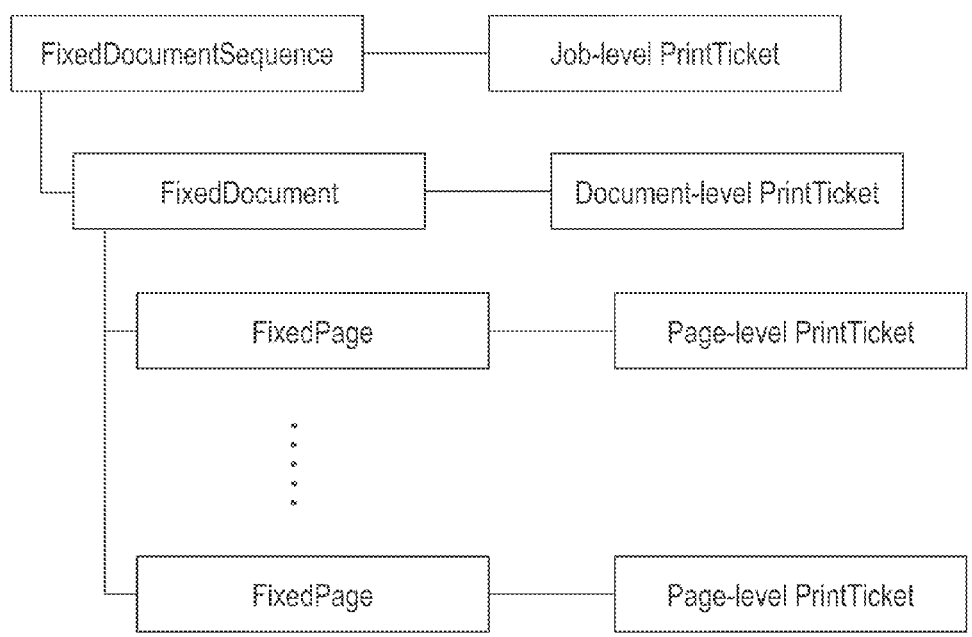
FIG. 8 is a block diagram illustrating an XPS structure.

FIG. 8 is a schematic diagram illustrating a data example of the XPS.

The XPS is a document format whose components are pieces of data called "parts". The parts are associated with each other within the XPS.

As the parts forming a document structure of an XPS, there are FixedDocumentSequence, FixedDocument, and FixedPage, which express a layered structure including elements named job, document, and page. The FixedDocumentSequence, the FixedDocument, and the FixedPage correspond to the job, the document, and the page, respectively. Here, the FixedPage is a piece of data in XML format, describing various drawing commands defined in the XPS. Further, each of the parts forming the document structure is associated with a part called PrintTicket that expresses print setting in XML format.

The PrintTicket is called Job-level PrintTicket, Document-level PrintTicket, or Page-level PrintTicket, depending on which part in the document structure the PrintTicket is associated with. The Job-level PrintTicket expresses print setting for the entire job, and the Document-level PrintTicket expresses print setting for a document that is a group of pages. The Page-level PrintTicket expresses print setting unique to each page.

Further, the Job-level PrintTicket describes information indicating whether to activate the print method to which the imaging processing is applied. A flow up to completion of describing this information in the Job-level PrintTicket will be described below.

The GPD file 303, which defines the functions of the V4 printer driver in the present exemplary embodiment, describes the function information indicating whether to activate the print method to which the imaging processing is applied. Therefore, a user can selectively activate or deactivate application of the imaging processing, via a print setting screen displayed by the OS configuration module 311 based on the GPD file 303. When a print instruction is provided to the application 401, the OS configuration module 311 receives setting of whether to activate the imaging processing, i.e., whether to perform the imaging processing, via the above-described print setting screen, and converts the received setting into a PrintTicket. The application 401 writes the converted PrintTicket as a Job-level PrintTicket in an XPS, when generating the XPS.

Referring back to FIG. 5, the description will be continued.

As a result of analyzing the Job-level PrintTicket by the imaging filter 403, if the print setting of the imaging processing is activated (YES in step S103), the processing proceeds to step S104. If the print setting of the imaging processing is not activated (NO in step S103), the processing proceeds to step S110.

First, step S104 to step S109 representing a flow in a case where the imaging processing is activated will be described.

In step S104, the imaging filter 403 determines whether a part representing a FixedPage can be acquired, via the API provided by the filter pipeline manager 402. If the part can be acquired (YES in step S104), the processing proceeds to step S105. If the part cannot be acquired, i.e., if a part representing the next FixedPage cannot be acquired via the API (NO in step S104), the imaging filter 403 has finished processing all pages included in a job, and therefore, the processing by the imaging filter 403 ends.

Next, in step S105, the imaging filter 403 waits until the command filter 405 generates an acquisition event to be described below. Upon generation of the acquisition event, the processing proceeds to step S106. In step S106, the imaging filter 403 images the FixedPage. Next, in step S107, the imaging filter 403 registers a resultant image as the image object 411 in the bypass object 409.

In the present exemplary embodiment, the image object 411 and the page setting object 412 in the bypass object 409 are each designed to store only information about a certain single page. The imaging filter 403 and the command filter 405 are programs to be executed asynchronously in different threads. Therefore, matching timings of these filters to each other, in such a manner that the imaging filter 403 registers an image of one imaged page is to be performed, and then the command filter 405 acquires this image, and after this acquisition, the imaging filter 403 registers an image of the next imaged page.

Here, two events are used, i.e., an acquisition event and a registration event.

The command filter 405 acquires the image object 411 and the page setting object 412, thereby generating the acquisition event. The imaging filter 403 cannot register the image object 411 and the page setting object 412, until the acquisition event is generated. Therefore, the imaging filter 403 can wait the registration of the image object 411 and the page setting object 412 until the acquisition event is generated, i.e., until the command filter 405 completes acquisition of the image object 411 and the page setting object 412.

On the other hand, the registration event is an event paired with the acquisition event. The imaging filter 403 generates the registration event, by registering the image object 411 and the page setting object 412. The command filter 405 cannot acquire the image object 411 and the page setting object 412 until the registration event is generated.

In the present exemplary embodiment, an event of Windows (registered trademark) is used for each of the acquisition event and the registration event, an API of WaitforMultipleObject is used for wait processing, and an API of SetEvent is used for wait-state cancelling processing.

Further, the imaging of the FixedPage in step S106 is to convert an XPS drawing command (a text command, a graphics command, or an image command) included in the FixedPage into a raster image. In the present exemplary embodiment, the imaging is assumed to convert the entire FixedPage into a single raster image, by using an XPS Rasterization Service provided by the OS 112. Further, a Joint Photographic Experts Group (JPEG) compression format, which allows high-speed and high-resolution printing, is adopted for the raster image. Therefore, a page of print data is converted into a raster image in step S106, and the raster image is stored as the print data in the storage area in step S107.

Next, in step S108, the imaging filter 403 extracts a part of a Page-level PrintTicket, via the API provided by the filter pipeline manager 402, and registers the extracted part as the page setting object 412, in the bypass object 409.

Next, in step S109, the imaging filter 403 generates the registration event.

Upon execution of step S109, the processing returns to step S104, which is the start of the flow in the case where the imaging processing is activated, to process the next page.

On the other hand, step S110 and step S111 represent a flow in a case where the imaging processing is deactivated.

In step S110, the imaging filter 403 determines whether the next FixedPage can be acquired, in a manner similar to step S104. When the next FixedPage can be acquired (YES in step S110), the processing proceeds to step S111. In step S111, since the imaging processing is unnecessary, the imaging filter 403 directly transmits the acquired FixedPage to the XPS standard filter 404 that is the next filter. When the next FixedPage cannot be acquired (NO in step S110), i.e., when processing for all pages is completed, the processing of the imaging filter 403 ends.

In the first exemplary embodiment, as apparent from the description of the flowchart of FIG. 5, the XPS standard filter 404 operates only when the imaging processing is deactivated and step S111 is executed.

The operation of the XPS standard filter 404 will be described below.

Figure 9A:
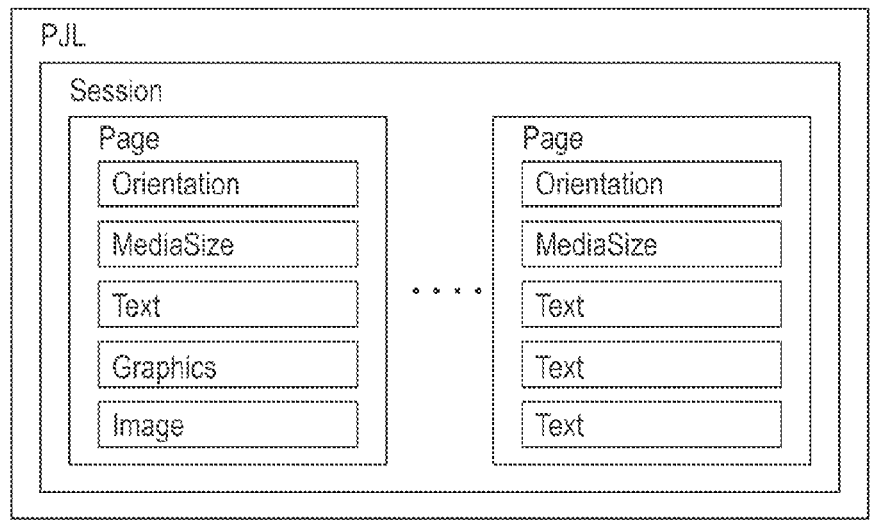
FIGS. 9A, 9B, and 9C are block diagrams each illustrating an example of a pattern of commands that may be included in a printer command language (PCL).

The XPS standard filter 404 converts print data and then transmits the converted print data to the command filter 405. More specifically, the XPS standard filter 404 converts an XPS into a PCL, and outputs the PCL. Therefore, first, a data structure of the PCL will be described referring to FIG. 9A.

The data structure of the PCL includes layers representing a document structure in a manner similar to the XPS, which are PJL, Session, and Page layered from the top. The Page includes print setting commands such as Orientation and MediaSize, as well as various drawing commands such as Text, Graphics, and Image.

Figure 6:
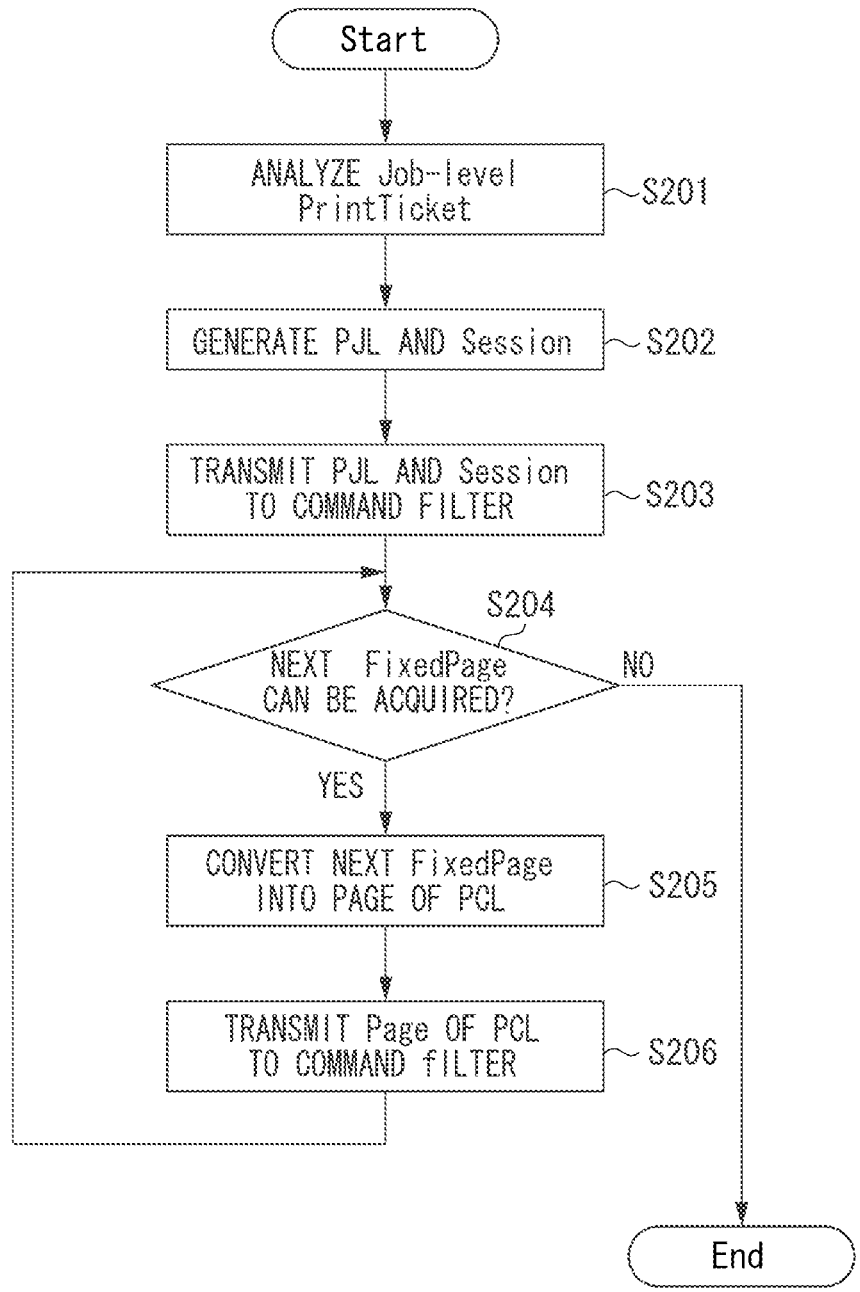
FIG. 6 is a flowchart illustrating a flow of processing of an extended markup language paper specification (XML paper specification or XPS) default filter according to the first exemplary embodiment.

FIG. 6 is a flowchart illustrating print processing by the XPS standard filter 404 according to the first exemplary embodiment.

First, in step S201, the XPS standard filter 404 analyzes a Job-level PrintTicket. Next, in step S202, the XPS standard filter 404 generates a printer job language (PJL) and a Session in a PCL, based on an analyzing result. In step S203, the XPS standard filter 404 transmits the generated PJL and Session to the command filter 405.

Next, in step S204, the XPS standard filter 404 determines whether the next FixedPage is present. If the next FixedPage is present (YES in step S204), then in step S205, the XPS standard filter 404 converts the next FixedPage into a Page of the PCL. Next, in step S206, the XPS standard filter 404 transmits the Page of the PCL to the command filter 405.

If the next FixedPage cannot be extracted (NO in step S204), i.e., if processing is completed for all pages, the processing of the XPS standard filter 404 ends.

Figure 7:
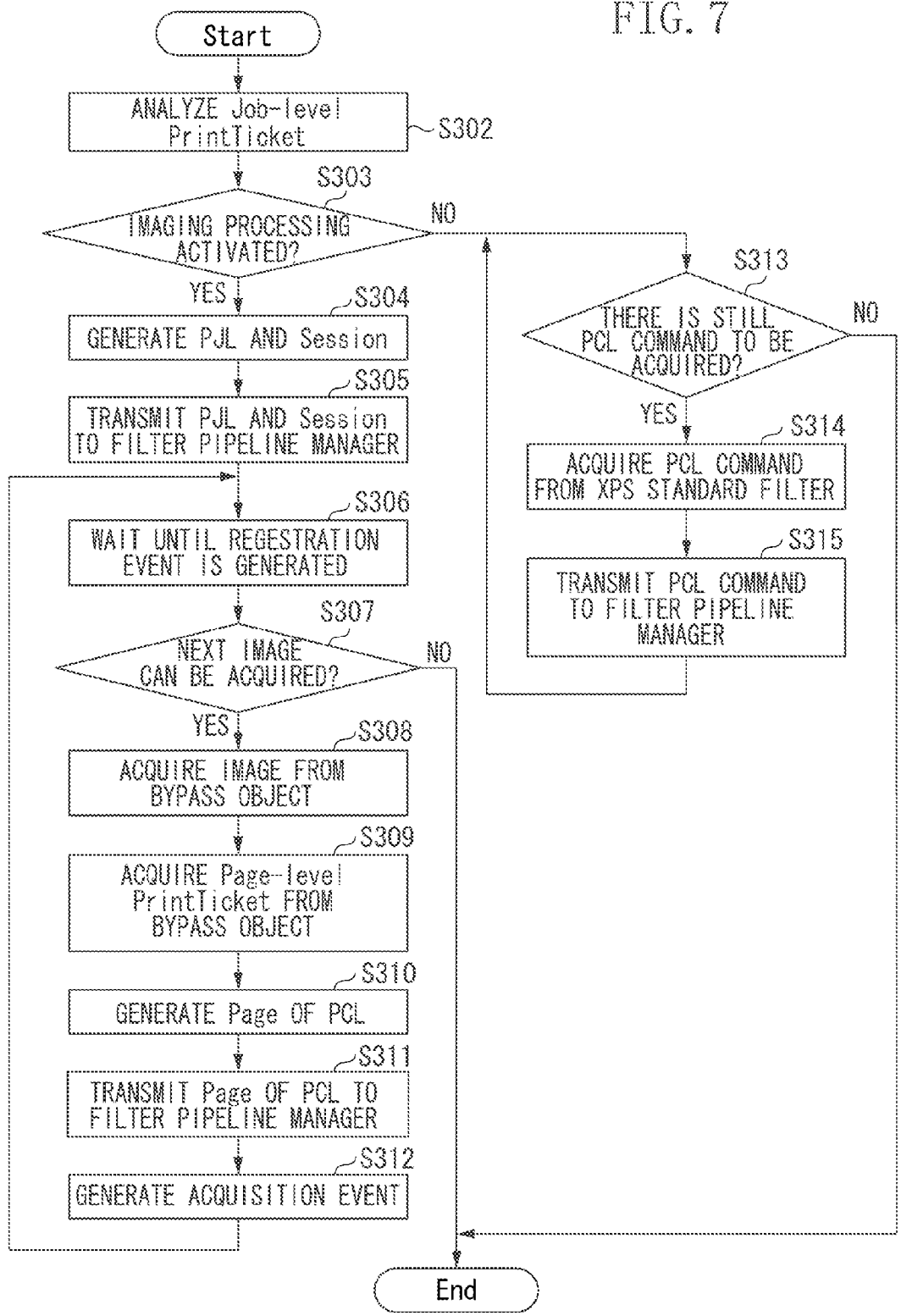
FIG. 7 is a flowchart illustrating a flow of processing of a command filter according to the first exemplary embodiment.

FIG. 7 is a flowchart illustrating print processing by the command filter 405 according to the first exemplary embodiment.

First, in step S302, the command filter 405 analyzes print setting described in a Job-level PrintTicket. Next, in step S303, the command filter 405 determines whether the imaging processing is activated. If the imaging processing is activated (YES in step S303), the processing proceeds to step S304. On the other hand, if the imaging processing is not activated (NO in step S303), the processing proceeds to step S313.

If the imaging processing is activated (YES in step S303), then in step S304, the command filter 405 generates a PJL and a Session of a PCL from the Job-level PrintTicket. In step S305, the command filter 405 transmits the generated PJL and Session to the filter pipeline manager 402.

Next, in step S306 to step S312, processing is performed for each page. Specifically, the command filter 405 generates a Page of the PCL based on information acquired from a bypass object, and transmits the generated Page of the PCL.

To be more specific, first, in step S306, the command filter 405 waits until the imaging filter 403 generates a registration event.

Upon generation of the registration event, the command filter 405 determines, in step S307, whether the next image object 411 can be acquired from the bypass object. If the command filter 405 determines that the next image object 411 can be acquired (YES in step S307), then in step S308, the command filter 405 acquires the image object 411. On the other hand, if the command filter 405 determines that the next image object 411 cannot be acquired (NO in step S307), the processing ends. In other words, in step S308, the command filter 405 acquires print data from the storage area.

Further, in step S309, the command filter 405 acquires the page setting object 412 (Page-level PrintTicket) associated with the image object 411.

In step S310, the command filter 405 generates an Image command of the PCL based on the image object 411, and generates commands such as Orientation and MediaSize based on the page setting object 412 (Page-level PrintTicket), and further generates a Page of the PCL based on these pieces of information. In step S311, the command filter 405 transmits the generated Page to the filter pipeline manager 402.

Each time the transmission of a Page is completed, the command filter 405 generates, in step S312, an acquisition event, thereby allowing the imaging filter 403 to register the image object 411 and the page setting object 412.

When it is determined in step S307 that all images are acquired (NO in step S307), the processing of the command filter 405 ends.

Figure 9B:
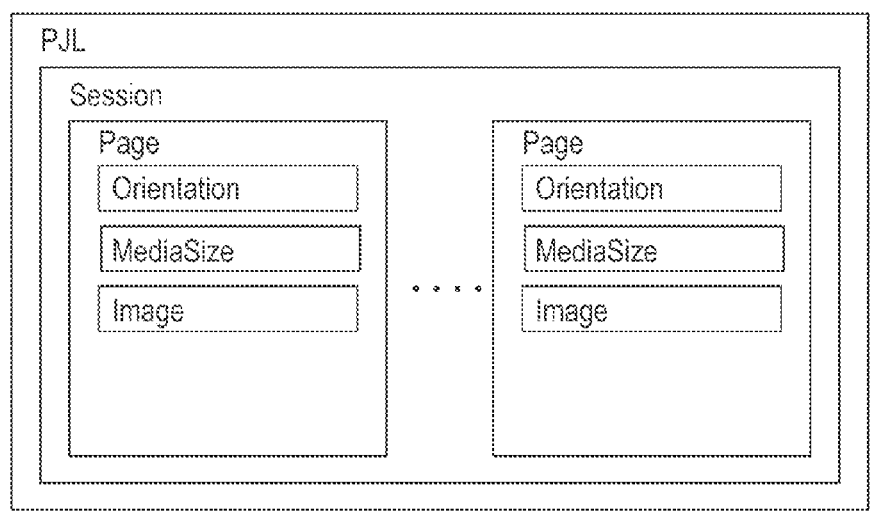

The PCL generated in step S306 to step S312 is a PCL to which the imaging processing is applied, and the drawing command of each Page includes only one Image command for drawing the entire imaged page (see an example illustrated in FIG. 9B).

On the other hand, if it is determined in step S303 that the imaging processing is deactivated (NO in step S303), the processing proceeds to step S313. In step S313, the command filter 405 determines whether there is still a PCL command to be extracted. If the command filter 405 determines that there is still a PCL command (YES in step S313), then in step S314, the command filter 405 acquires a PCL command transmitted from the XPS standard filter 404. Next, in step S315, the command filter 405 transmits the acquired PCL command to the filter pipeline manager 402. When there is no more PCL command to be acquired (NO in step S313), the processing by the command filter 405 ends.

In the processing represented by the flowchart of each of FIGS. 5 and 7, the information for only one page is registered in the bypass object 409. However, information for one or more pages may be registered.

Windows (registered trademark) 8 also provides a default XPS filter (MSxpsPS.dll) that supports not only PCL but also PostScript (PS). Needless to say, the method described in the present exemplary embodiment is applicable to the PS, as with the PCL.

As described above, in the first exemplary embodiment of the present invention, a PCL to which the imaging processing is applied can be generated, by transmitting information about image and page setting to the command filter 405, not via the XPS standard filter 404.

Next, a second exemplary embodiment of the present invention will be described with reference to FIGS. 10 and 11.

In the first exemplary embodiment, no data is transmitted to the XPS standard filter 404 in the case where the imaging processing is activated. In contrast, in the second exemplary embodiment, a method of transmitting an XPS including a blank FixedPage will be described.

FIG. 10 is a flowchart illustrating a flow of processing of an imaging filter 403 according to the second exemplary embodiment.

The processing to be performed in step S401 to step S407 is identical with the processing performed in step S101 to step S107, respectively.

In other words, the processing from imaging of a FixedPage in a case where imaging processing is activated to registration of an image in a bypass object 409 is executed in the same manner as in the first exemplary embodiment.

Next, in step S408, the imaging filter 403 transmits a blank FixedPage to an XPS standard filter 404. In step S409, the imaging filter 403 generates a registration event.

The blank FixedPage refers to a FixedPage including no drawing command.

If the FixedPage including no drawing command is transmitted to the XPS standard filter 404, the XPS standard filter 404 generates a Page of a PCL including no drawing command, and then transmits the generated Page of the PCL to a command filter 405.

Figure 9C:
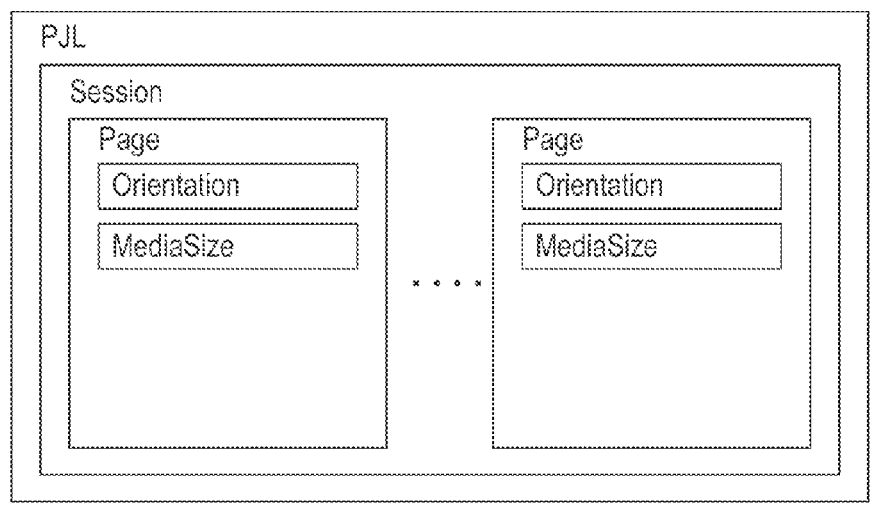

However, the imaging filter 403 associates the original Page-level PrintTicket with the blank FixedPage to be transmitted, and then transmits the blank FixedPage to the XPS standard filter 404. Therefore, the PCL output by the XPS standard filter 404 includes page setting commands such as Orientation and MediaSize as illustrated in FIG. 9C.

As will be described below, the command filter 405 can generate a PCL illustrated in FIG. 9B, by inserting an image object 411 as an Image command, into this Page that includes the page setting commands and no drawing command.

The processing to be performed in step S410 and step S411 in a case where the imaging processing is deactivated is similar to that performed in step S110 and step S111, respectively.

Figure 11:
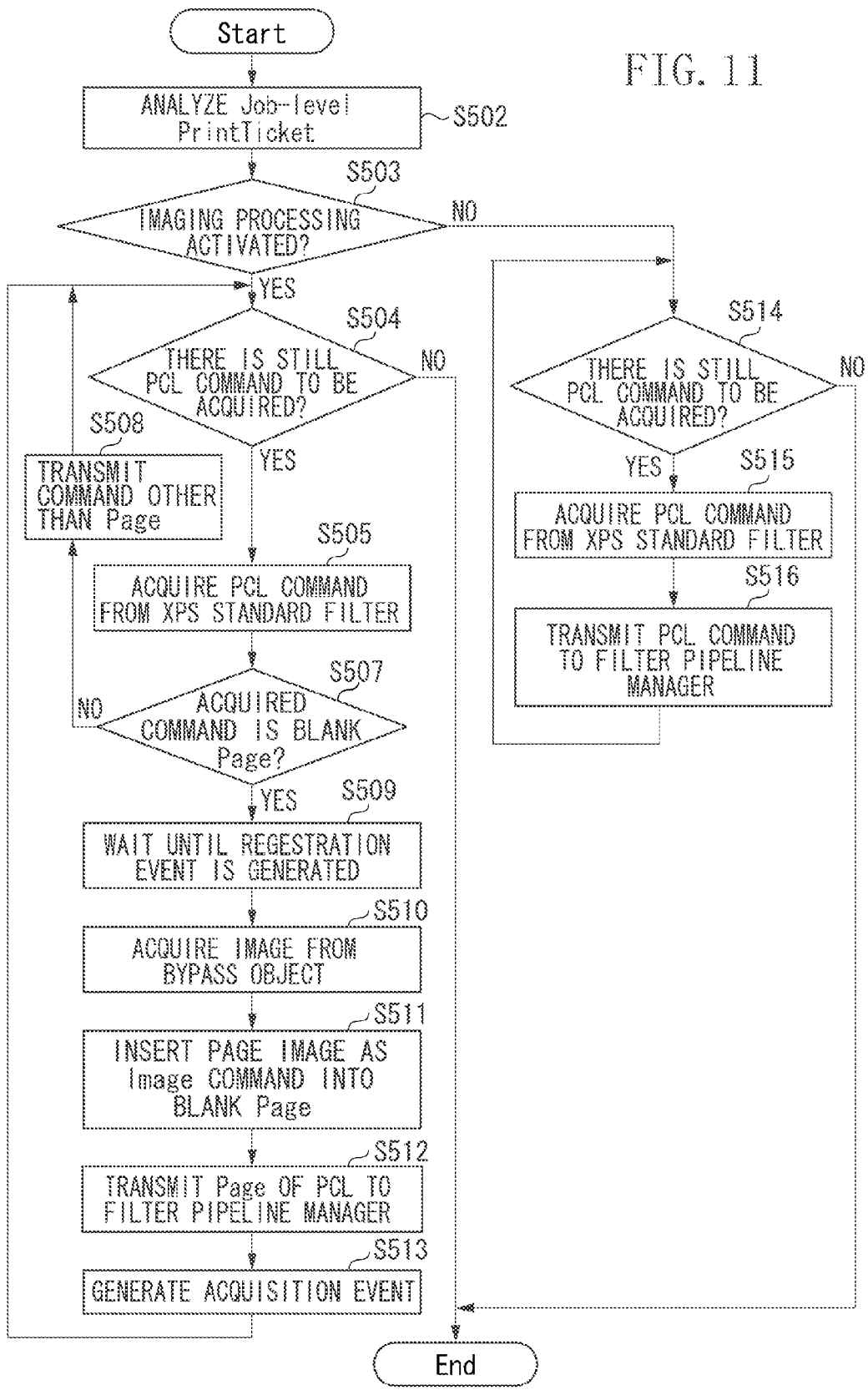
FIG. 11 is a flowchart illustrating a flow of processing of a command filter according to the second exemplary embodiment.

FIG. 11 is a flowchart illustrating a flow of processing by the command filter 405 in the second exemplary embodiment.

The processing to be performed in step S502 and step S503 is similar to that performed in step S302 and step S303, respectively.

In other words, the processing up to determining whether the imaging processing is activated is the same as that performed in the first exemplary embodiment.

Next, if there is a PCL command transmitted from the XPS standard filter 404 (YES in step S504), then in step S505, the command filter 405 acquires this PCL command.

Next, in step S507, the command filter 405 determines whether the acquired PCL command is a blank Page. If the acquired PCL command is a command other than a blank Page (NO in step S507), then in step S508, the command filter 405 directly transmits the PCL command to a filter pipeline manager 402, and then the processing returns to step S504 to receive a new PCL command from the XPS standard filter 404. If a blank Page is successfully acquired (YES in step S507), then in step S509, the command filter 405 waits until a registration event is generated. In step S510, upon generation of a registration event, the command filter 405 acquires the image object 411 from a bypass object. Next, in step S511, the command filter 405 inserts, as an Image command, the image object 411 acquired from the bypass object in step S510, into the blank Page including no drawing command.

In step S512, upon completion of a new Page into which the Image command is inserted, the command filter 405 transmits the new Page to the filter pipeline manager 402. Subsequently, in step S513, the command filter 405 generates an acquisition event.

The processing to be performed in step S514 to step S516 in a case where the imaging processing is deactivated is identical with the processing performed in step S313 to step S315, respectively.

As described above, in the print processing in the second exemplary embodiment as well, it is possible to generate a PCL including a Page that includes setting commands and one Image command representing an image of a page, like the example illustrated in FIG. 9B.

In the method according to the second exemplary embodiment, the XPS standard filter 404 adds the page setting commands such as Orientation and MediaSize for the page setting. Therefore, there is such a feature that the command filter 405 can omit processing of generating the page setting commands.

The present invention is also achievable by such processing that a program implementing one or more functions of the above-described exemplary embodiments is supplied to a system or apparatus via a network or storage medium, and one or more processors in a computer of the system or apparatus read the program and then execute the read program. Moreover, the present invention is also achievable by a circuit (e.g., an application-specific integrated circuit (ASIC)) that implements one or more functions.

According to the exemplary embodiments of the present invention, occurrence of a drawing failure can be prevented by detouring around a specific filter according to setting, even if the specific filter is adopted.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-151195, filed Jul. 24, 2014, which is hereby incorporated by reference herein in its entirety.

What is claimed is:

1. An information processing apparatus executing a plurality of filters for processing print data, comprising:
a memory; and
a processor in communication with the memory, the processor configured to control:
an accepting unit, implemented by displaying a print setting screen on a display, configured to accept setting of whether to perform imaging processing of converting each page of first print data into a raster image or not,
wherein the plurality of filters include a first filter, a second filter, and a third filter, the first filter converts the each page of first print data into the raster image, the second filter performing converting processing for converting first print data into second print data of a predetermined page description language, the third filter acquires the second print data from the second filter,
wherein, in a case where the accepting unit accepts setting of performing the imaging processing, the first filter converts the each page of the first print data into a raster image and stores the raster image as third print data in a storage area, and the third filter acquires, from the storage area, the third print data not converted through the converting processing by the second filter, and
wherein, in a case where the accepting unit accepts setting of not performing the imaging processing, the first filter transmits the first print data to the second filter, and the third filter acquires the second print data after the first print data is converted by the second filter.

2. The information processing apparatus according to claim 1, wherein, if the accepting unit accepts setting of performing the imaging processing,
the first filter transmits a blank page to the second filter, and
the third filter inserts the third print data into the blank page.

3. The information processing apparatus according to claim 1,
wherein, in a case where the accepting unit accepts setting of performing the imaging processing, the third filter converts the third print data into a PCL as the predetermined page description language, and
wherein, in a case where the accepting unit accepts setting of not performing the imaging processing, the second filter converts the first print data into a PCL as the second print data.

4. The information processing apparatus according to claim 1, wherein, if the accepting unit accepts setting of performing the imaging processing,
the first filter waits until a first event is generated, and if the first event is generated, the first filter stores the third print data in the storage area, and generates a second event, and the third filter waits until the second event is generated, and if the second event is generated, the third filter acquires the third print data from the storage area, and generates the first event.

5. A control method for executing a plurality of filters for processing print data, the control method comprising:
accepting a setting of whether to perform imaging processing of converting each page of first print data into a raster image or not,
wherein the plurality of filters include a first filter, a second filter, and a third filter, the first filter converting the each page of first print data into the raster image, and the second filter converting processing for converting the first data into second print data of a predetermined page description language, the third filter acquires the second print data from the second filter,
wherein, in a case where the accepting accepts setting of performing the imaging processing, the first filter converts the each page of the first print data into the raster image and stores the raster image as third print data in a storage area, and the third filter acquires, from the storage area, the third print data not converted through the converting processing by the second filter, and
wherein, in a case where the accepting accepts setting of not performing the imaging processing, the first filter transmits the first print data to the second filter, and the third filter acquires the second print data after the first print data is converted by the second filter.

6. The control method according to claim 5, wherein the accepting includes displaying a print setting screen configured to accept setting of whether to perform the imaging processing.

7. The control method according to claim 5, wherein, if the accepting accepts setting of performing the imaging processing,
the first filter transmits a blank page to the second filter, and
the third filter inserts the third print data into the blank page.

8. The control method according to claim 5, wherein, in a case where the accepting accepts setting of performing the imaging processing, the third filter converts the third print data into a PCL as the predetermined page description language, and in a case where the accepting accepts setting of not performing the imaging processing, the second filter converts the first print data into a PCL as the second print data.

9. The control method according to claim 5, wherein, if the accepting accepts setting of performing the imaging processing,
the first filter waits until a first event is generated, and if the first event is generated, the first filter stores the third print data in the storage area, and generates a second event, and
the third filter waits until the second event is generated, and if the second event is generated, the third filter acquires the third print data from the storage area, and generates the first event.

10. A non-transitory recording medium that records a program for causing a computer to execute a method for executing a plurality of filters for processing print data, the method comprising:
accepting setting of whether to perform imaging processing of converting each page of first print data into a raster image or not,
wherein the plurality of filters include a first filter, a second filter, and a third filter, the first filter converting the each page of the first print data into the raster image, and the second filter converting processing for converting first print data into second print data of a predetermined page description language, the third filter acquires the second print data from the second filter,
wherein, in a case where the accepting accepts setting of performing the imaging processing, the first filter converts the each page of the first print data into the raster image and stores the raster image as third print data in a storage area, and the third filter acquires, from the storage area, the third print data not converted through the converting processing by the second filter, and
wherein, in a case where the accepting accepts setting of not performing the imaging processing, the first filter transmits the first print data to the second filter, and the third filter acquires the-second print data after the first print data is converted by the second filter.

11. The non-transitory recording medium according to claim 10, wherein the accepting includes displaying a print setting screen configured to accept setting of whether to perform the imaging processing.

12. The non-transitory recording medium according to claim 10, wherein, if the accepting accepts setting of performing the imaging processing,
the first filter transmits a blank page to the second filter, and
the third filter inserts the third print data into the blank page.

13. The non-transitory recording medium according to claim 10, wherein, in a case where the accepting accepts setting of performing the imaging processing,
the third filter converts the third print data into a PCL as the predetermined page description language, and
wherein, in a case where the accepting accepts setting of not performing the imaging processing, the second filter converts the first print data into a PCL as the second print data.

14. The non-transitory recording medium according to claim 10, wherein, if the accepting accepts setting of performing the imaging processing,
the first filter waits until a first event is generated, and if the first event is generated, the first filter stores the third print data in the storage area, and generates a second event, and
the third filter waits until the second event is generated, and if the second event is generated, the third filter acquires the third print data from the storage area, and generates the first event.

* * * * *